(12) United States Patent
Amaitis et al.

(10) Patent No.: US 11,250,668 B2
(45) Date of Patent: *Feb. 15, 2022

(54) SYSTEM AND METHOD FOR WIRELESS GAMING SYSTEM WITH ALERTS

(71) Applicant: INTERACTIVE GAMES LLC, New York, NY (US)

(72) Inventors: Lee M. Amaitis, Las Vegas, NV (US); Joseph M. Asher, Las Vegas, NV (US); Robert F. Bahrampour, New York, NY (US); Darrin M. Mylet, Tampa, FL (US); Alan B. Wilkins, Cary, NC (US); Howard W. Lutnick, New York, NY (US)

(73) Assignee: INTERACTIVE GAMES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,778

(22) Filed: Jun. 1, 2020

(65) Prior Publication Data

US 2020/0294363 A1  Sep. 17, 2020

Related U.S. Application Data

(63) Continuation of application No. 13/615,981, filed on Sep. 14, 2012, now abandoned, which is a continuation of application No. 12/647,887, filed on Dec. 28, 2009, now Pat. No. 8,506,400, which is a continuation of application No. 11/199,831, filed on Aug. 9, 2005, now Pat. No. 7,637,810, which is a (Continued)

(51) Int. Cl.
  *G07F 17/32* (2006.01)
  *G06Q 20/32* (2012.01)

(52) U.S. Cl.
  CPC ..... *G07F 17/3269* (2013.01); *G06Q 20/3224* (2013.01); *G07F 17/32* (2013.01); *G07F 17/3218* (2013.01); *G07F 17/3223* (2013.01); *G07F 17/3241* (2013.01); *A63F 2300/5573* (2013.01)

(58) Field of Classification Search
  CPC .. G07F 17/32; G07F 17/3223; G07F 17/3225; G07F 17/323; G07F 17/3272
  USPC ..................................................... 463/39–42
  See application file for complete search history.

(56) References Cited

U.S. PATENT DOCUMENTS

| | | | | |
|---|---|---|---|---|
| 6,177,905 B1 * | 1/2001 | Welch | ...................... | G01S 19/14 |
| | | | | 342/357.75 |
| 6,243,039 B1 * | 6/2001 | Elliot | ...................... | G01S 19/16 |
| | | | | 342/357.74 |

(Continued)

*Primary Examiner* — Chase E Leichliter

(57) ABSTRACT

A gaming system is provided. The gaming system allows users to access applications via gaming communication devices coupled to a communication network. At least a portion of the network may be wireless. The gaming applications include gambling, financial, entertainment service, and other types of transactions. The system may include a user location determination feature to prevent users from conducting transactions from unauthorized areas. The system may include an alerts feature operable to generate alert to users based on any or a combination of time information, location information, financial information, user profile information, and other types of information.

20 Claims, 5 Drawing Sheets

Related U.S. Application Data continuation of application No. 10/835,995, filed on Apr. 29, 2004, now Pat. No. 8,092,303.

(60) Provisional application No. 60/697,861, filed on Jul. 8, 2005, provisional application No. 60/547,507, filed on Feb. 25, 2004, provisional application No. 60/549,187, filed on Mar. 1, 2004.

(56) References Cited

U.S. PATENT DOCUMENTS

| | | | | |
|---|---|---|---|---|
| 6,320,495 B1* | 11/2001 | Sporgis | | A63F 13/12 340/323 R |
| 6,441,752 B1* | 8/2002 | Fomukong | | B60R 25/102 340/988 |
| 6,520,853 B2* | 2/2003 | Suzuki | | A63F 13/12 463/7 |
| 6,680,675 B1* | 1/2004 | Suzuki | | G01C 21/34 340/539.13 |
| 6,691,032 B1* | 2/2004 | Irish | | H04L 67/38 701/487 |
| 7,027,820 B2* | 4/2006 | Spratt | | G01S 1/045 455/41.2 |
| 7,113,107 B2* | 9/2006 | Taylor | | G08G 1/00 340/539.13 |
| 7,311,605 B2* | 12/2007 | Moser | | G07F 17/32 463/25 |
| 7,394,405 B2* | 7/2008 | Godden | | G08G 3/02 340/988 |
| 7,828,652 B2* | 11/2010 | Nguyen | | G06Q 20/0855 463/29 |
| 2001/0049275 A1* | 12/2001 | Pierry | | G06Q 30/06 455/414.1 |
| 2002/0184653 A1* | 12/2002 | Pierce | | G01S 5/0054 725/143 |
| 2003/0006913 A1* | 1/2003 | Joyce | | G06Q 20/3224 340/994 |
| 2003/0006931 A1* | 1/2003 | Mages | | G07F 17/32 342/357.32 |
| 2003/0036428 A1* | 2/2003 | Aasland | | A63F 13/216 463/29 |
| 2003/0232647 A1* | 12/2003 | Moser | | G07F 17/3237 463/29 |
| 2004/0044774 A1* | 3/2004 | Mangalik | | H04L 67/2819 709/227 |
| 2004/0082383 A1* | 4/2004 | Muncaster | | A63F 13/12 463/39 |
| 2004/0127277 A1* | 7/2004 | Walker | | G07F 17/3227 463/16 |
| 2004/0137987 A1* | 7/2004 | Nguyen | | G07F 17/3202 463/42 |
| 2004/0198386 A1* | 10/2004 | Dupray | | H04W 64/00 455/456.1 |
| 2004/0198398 A1* | 10/2004 | Amir | | H04W 4/02 455/456.6 |
| 2004/0242332 A1* | 12/2004 | Walker | | A63F 13/79 463/42 |
| 2004/0248637 A1* | 12/2004 | Liebenberg | | G07F 17/32 463/16 |
| 2005/0090294 A1* | 4/2005 | Narasimhan | | H04L 67/36 455/575.1 |
| 2005/0170845 A1* | 8/2005 | Moran | | H04M 1/2745 455/456.1 |
| 2005/0181870 A1* | 8/2005 | Nguyen | | G06Q 20/0855 463/29 |
| 2006/0035707 A1* | 2/2006 | Nguyen | | G07F 17/323 463/29 |
| 2006/0166740 A1* | 7/2006 | Sufuentes | | A63F 13/798 463/40 |
| 2007/0190494 A1* | 8/2007 | Rosenberg | | A63F 13/79 434/11 |
| 2008/0009349 A1* | 1/2008 | Wolfe | | H04L 67/38 463/42 |

* cited by examiner

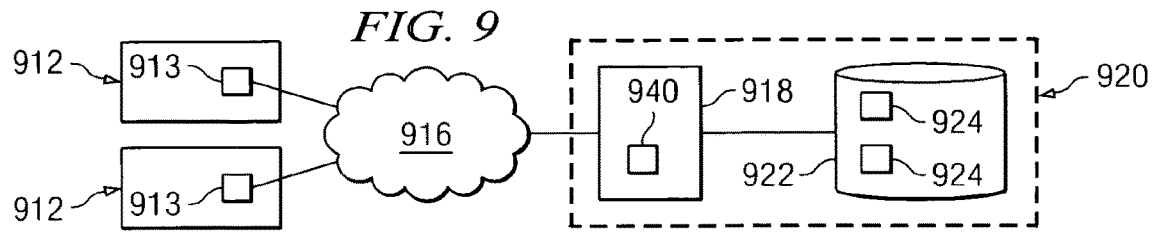
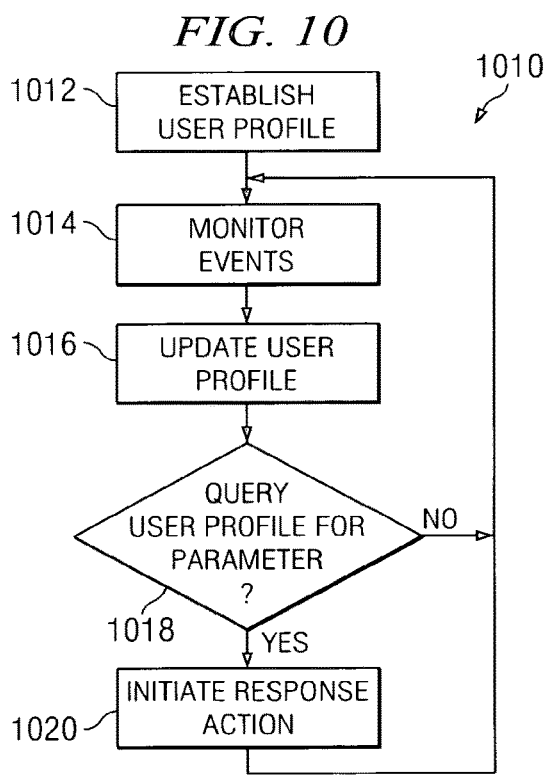
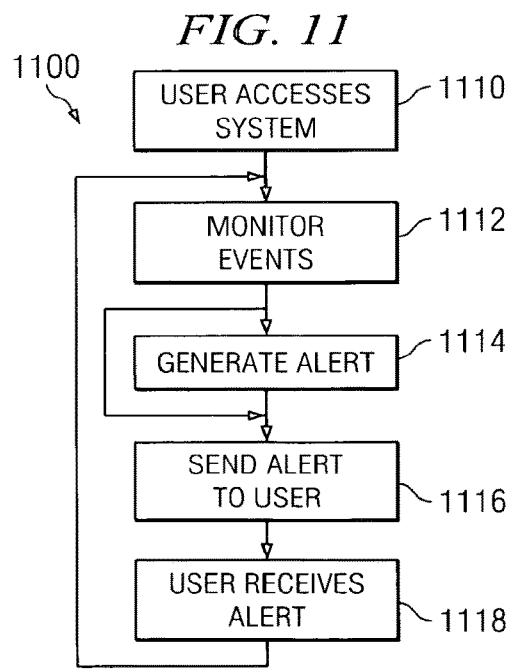

SYSTEM AND METHOD FOR WIRELESS GAMING SYSTEM WITH ALERTS

RELATED APPLICATIONS

This application is a continuation of U.S. patent application Ser. No. 13/615,981 filed Sep. 14, 2012 which is a continuation of U.S. patent application Ser. No. 12/647,887 filed Dec. 28, 2009 (now U.S. Pat. No. 8,506,400 issued on Aug. 13, 2013), which is a continuation of U.S. patent application Ser. No. 11/199,831 filed Aug. 9, 2005 (now U.S. Pat. No. 7,637,810 issued on Dec. 29, 2009), which claims the benefit of U.S. Provisional Patent Application No. 60/697,861 filed Jul. 8, 2005, and claims priority to U.S. application Ser. No. 11/063,311 filed on Feb. 21, 2005, which is a continuation-in-part of U.S. application Ser. No. 10/835,995 filed on Apr. 29, 2004, which claims the benefit of U.S. Provisional Application No. 60/547,507 filed on Feb. 25, 2004 and U.S. Provisional Application No. 60/549,187 filed on Mar. 1, 2004. Each of these applications is incorporated herein by reference in its entirety.

TECHNICAL FIELD

The present invention relates generally to the field of gaming and, more particularly to a gaming system and method incorporating a wireless network and providing alerts and other notifications to users.

BACKGROUND

The gaming industry allows people to participate in a variety of gaming activities within the limits of state and federal law. Possible gaming activities include gambling, such as that provided by casinos. Casino-type gambling activities include, but are not limited to, slot machines, table games, poker, keno, and other gaming activities that allow for the placement of bets. Events also may be wagered on and may include, for example, sporting events, such as horse or auto racing, and athletic competitions such as football, basketball, baseball, boxing, and golf. Gaming can also include non-wagering games and events, such as lottery contests. In a casino environment, the participation in such gaming activities is generally limited by a participant's physical location. For example, participants in casino-type gambling activities must be present at a gaming machine or at a gaming table within the casino in order to place a bet. Similarly, people interested in wagering on sporting events or athletic competitions in a casino environment must place bets through a sports book that is located in the casino.

SUMMARY

Various embodiments of the invention are directed to gaming systems, which may be wireless gaming systems. According to certain embodiments, the gaming system is operable to make various gaming activities available to one or more users over a communications network and to display information associated with the activities to the users on gaming devices. The gaming devices may be mobile communication devices. Gaming activities may include any activities referred to or contemplated herein and are not limited to games. Gaming activities can include, for example, games, gambling activities, sporting events, purchase of goods or services, and accessing concierge services. According to one embodiment the system includes at least one processor, at least one data storage device electronically coupled to the processor, and at least one gaming device in electronic communication with the processor. The at least one data storage device stores alert information associated with a gaming activity. The system is operable to recognize an event. The at least one processor is operable to generate an alert in response to the event. The alert includes at least a portion of the alert information. The system is further operable to forward the alert to the at least one gaming device for presentation to a user of the at least one gaming device.

According to another embodiment, a method is provided for providing an alert to a user on a gaming system. The method includes several steps. In one step, a communications link is established between a user device and a processor. In another step, alert information is stored on a data storage device. In another step, an electronic signal corresponding to the occurrence of an event is recognized. In another step, the processor is activated to generate an alert in response to the signal. In another step, the alert is forwarded to the user based on at least one or more criteria.

According to another embodiment, software is provided for providing an alert to a user on a gaming system. The software operable to establish a communications link between a user device and a processor. The software is further operable to store alert information on a data storage device. The software is further operable to recognize an electronic signal corresponding to the occurrence of an event. The software is further operable to activate the processor to generate an alert in response to the signal. The software is further operable to forward the alert to the user based on at least one or more criteria.

Various embodiments of the present invention may benefit from numerous advantages. It should be noted that one or more embodiments may benefit from some, none, or all of the advantages discussed below.

One advantage is that the system enables remote, wireless, mobile gaming over a secure network. Another advantage is that the system enables remote, wireless, mobile, gaming, while preventing gaming by unauthorized users and from unauthorized locations. Another advantage is the enablement of a gaming system accessible by remote, wireless, mobile users, wherein the system includes gaming communication devices used by the users and connected to a communication network, and wherein a portion of the communication network is movable.

Certain embodiments present advantages related particular to the alerts. Among other things, a gaming system provides alerts to users to inform users of opportunities to participate in events, when the users might not otherwise know about the opportunities. The system provides a more personalized gaming experience for users. The system increases revenue by presenting gaming opportunities to users in more places than the location of a physical gaming facility. The system provides alerts that may be generated, configured, presented, and distributed in multiple different ways depending upon effective combinations of time information, user location information, user preference and profile information, and other types of information.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 9 illustrates a wireless gaming system with user profiles and an alert generation module in accordance with an embodiment of the present invention;

FIG. 10 illustrates a method of providing user profiles in a wireless gaming system in accordance with an embodiment of the present invention; and FIG. 11 illustrates a method of providing an alert to a user of a wireless gaming system in accordance with an embodiment of the present invention.

DETAILED DESCRIPTION

Figure 1:
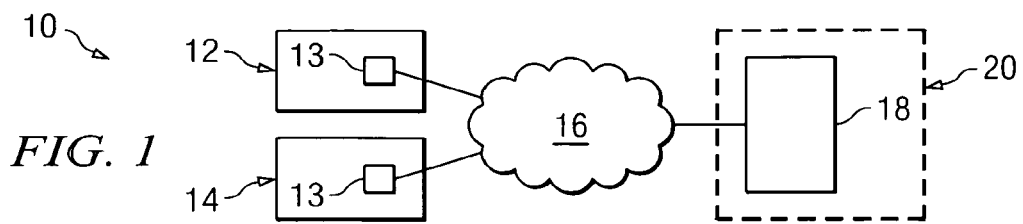
FIG. 1 illustrates a gaming system according to an embodiment of the present invention.

A gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include WiFi and WiMax networks. In one embodiment, the gaming system communications network is entirely independent of the Internet. In another embodiment, the gaming system operation makes minimal use of the Internet, such that only information for which there is no security issues is transmitted via the Internet and/or information may be encrypted. Preferably, the communications network enables players to participate in gaming from remote locations (e.g., outside of the gaming area of a casino). Also, the system may enable players to be mobile during participation in the gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law.

Certain embodiments are directed to an alert feature. For example, the gaming system may be configured to initiate one or more alerts to one or more users based on any number of criteria. For instance, an alert may be based on the location of a user. The system may also be configured to keep track of other non-location dependent parameters. The initiation of an alert may depend on a time parameter. Gaming alerts can also be based on this and/or other information maintained in a user profile. Alerts can be prioritized for presentation and the content and display of the alerts may be customized by the user or another entity. As a related concept, the system may be configured to provide directions and/or maps. Another related concept involves enabling a user to view a certain activity or area remotely. The alert may be generated in response to the existence of data within a user profile. Additionally, the content and presentation of the alert may be determined based on information in the user profile. Thus, when the alerts occur, as well as what the alerts indicate may be customized or tailored according to user preferences (or any other information maintained about the user (e.g., in a user profile).

As shown in FIG. 1, for example, gaming system 10 includes at least one user 12. The system may include additional users such that there is at least a first user 12 and a second user 14. Multiple users may access a first gaming system 10, while other multiple users access a second gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user. Software resident on the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. In particular embodiments, network 16 may include a Land Area Network (LAN), a Wide Area Network (WAN), a Metropolitan Area Network (MAN), a Personal Area Network (PAN), the Internet, an Intranet, an Extranet, or any combination of these or other suitable communication networks. Some specific technologies which may be used include, without limitation, Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of gaming information takes place without involvement of the Internet. However, in certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Various aspects of embodiments directed to the alert feature are illustrated in FIGS. 9-11. As shown in FIG. 9, for example, certain embodiments of the gaming system may include software and hardware to enable the provision of alerts to one or more users of the system. Accordingly, system 910 includes at least one user 912. Users 912 preferably access system 910 by way of gaming communication devices 913. Gaming communication devices 913 transmit and receive gaming information to and from communications network 916. Gaming information is also transmitted between network 916 and a computer 918, such as a server, which may reside within the domain of a gaming service provider 920. As with the description of system 10 in connection with FIG. 1, this is an example illustration only and it will be readily understood that system 910 may be modified in any number of ways within the scope and spirit of the detailed description. For example, the computer 918 may comprise multiple servers, which may be centralized or distributed. Preferably, system 910 includes at least one database 922. The database(s) 922 may be any suitable database capable of receiving, storing, and/or distributing electronic data.

System 910 also includes an alerts module 940. Alerts module 940 is shown as being maintained on computer 918, but alerts module 940 may be located in different locations and also may be distributed across multiple locations or platforms. For example, portions of software comprising the alerts module may be maintained on one or more servers, while other portions may be maintained on the gaming devices.

Preferably alerts module 940 is operable to perform various functions associated with initiating alerts, determining the content of alerts, and forwarding alerts to users, based on certain parameters described more fully below in connection with FIG. 11.

FIG. 11 illustrates a method 1100 of providing alerts in accordance with an example embodiment. In step 1110, a user accesses the gaming system. In step 1112, the system recognizes the occurrence of an event. In step 1114, the system generates an alert at least partially in response to the event. In step 1116, the alert is forwarded to the user. In step 1118, the user receives the alert.

Step 1110 may be accomplished according to any of the various methods or configurations described or contemplated herein. For example, the user may be a new user and receive a gaming device from a hotel, casino, gaming service provider, telecommunications provider or other entity. The user may register the device to enable gaming services or the device may be pre-registered. The user may provide certain identity and/or credit information in order to be allowed to participate in certain gaming activities. As described more fully below, the system may be provided with a user profile feature. User information and other information not necessarily associated with a particular user may be collected, maintained, and modified by the system. The information may be maintained in a user profile. The user profile may at least partially dictate the generation, content, and provisioning of an alert to a user. Preferably, when a user accesses the system the system either initiates a default alerts preference or a customized alerts preference based on information about, or associated with, the user and/or the user's profile. For example, if the user has an associated user profile, the alerts module may, upon access of the system by the user, query the user profile to determine the user's preferences regarding content and distribution of alerts. Alternatively, a default alerts configuration may be predetermined and established for users that have not specified any preferences.

Step 1112 may be accomplished by any process or technique in which an event, condition, parameter, etc. may be electronically represented and recognized by the system (e.g., recognized by software operating on a system server). Events can include any occurrence or change in a condition. For example, an event may be the occurrence of a particular time, such as a time of day, or a certain minute of an hour.

An event may be the arrival at, departure from, or the existence of a user or gaming device, or other item or person at a particular location. The event may be the occurrence of some action or activity, such as the start of a show or sporting event, the opening or closing of a store or restaurant, the opening of a certain physical or virtual gaming table, etc. The event may be administrative in nature, such as a particular staff person going on duty, scheduled maintenance of a device or system, an action by a service person (e.g., entry of a cleaning person into a hotel room), etc. The event may be financial in nature, such as a change in the credit status of a user, or the placement of a bet within a range or above or below a certain threshold.

The event may directly trigger an alert, or may cause an update to information maintained on the system and, at the same time or later, indirectly result in an alert. The event may result in an event being generated. The event may determine the content of the alert. The event may determine how the content is presented to a user. The alert may determine which user(s) receives the alert or how the alert is otherwise distributed or managed.

Step 1114 may be accomplished according to any suitable technique or process for generating electronic information. For example, upon the occurrence of an event, software which comprises part of the alerts module may recognize the existence of a value in a certain data field. In response, the software may generate a data set that represents an alert message. As indicated previously, whether the alert is generated, its content and presentation to a user, and the distribution of the alert may all be dictated at least partially by any of the various parameters described or contemplated herein.

The alerts module may configure alerts according any of a number of parameters or combinations thereof. As one example, an alerts configuration may specify that an alert will be sent to a user based on a particular date; day or days of the week, month or year; time or multiple times of day, etc. Such alerts may be referred to as time-based alerts. Any or all of the content, presentation, timing, and distribution of the alerts may be dictated by time.

The alerts may also be configured to generated, presented, and/or distributed according to the location of the user, or according to the location of a different user. For example, if a user is in a certain location (e.g., a pool area of a casino property) the content of an alert may be related to the location. In this example situation, the content of the alert might include directions from the user's location to a particular event. As another example, an alert sent to a user located in the pool area might begin "When you leave the pool, you might be interested in . . . " As another example, an alert might only be sent to user's in a certain location. For example, an alert about the beginning of a poker tournament might only be sent to those users in the same state, city, or venue of the poker tournament. Similarly, the alert to a first user may be based on the location of a second user. For instance, a first user may have a friend who is a second user and is on the first user's buddy network on the system. The first user might be at a first location and the second user at a second location. If the second user leaves the second location, enters the first location, or enters a third location, the result may be that an alert is sent to the second user based at least partially on the activity being engaged in by the first user. As an example the first user might be at a blackjack table in a first casino. The second user might be in a sports book in a second casino. If the second user leaves the sports book, an alert might be generated and distributed to the second user notifying him that the first user is at the blackjack table in the first casino and inviting the second user to join the first user. Such alerts may be referred to as location-based alerts. Any or all of the content, presentation, timing, and distribution of the alerts may be dictated by the location of the user or another user or gaming device connected to the system.

The generation, content, and distribution of location-based alerts may be combined with any of the various location-determination techniques described or contemplated herein. As an example, location determination may be used to determine that a user is located within a certain area, such as within a casino property. As a result, an alert may be sent to the user (e.g., to be displayed on a gaming device) inviting the user to visit and play at a type of game, or at a particular table physically located within the casino gaming area, or to participate in a particular game on the gaming device. As another example, if a player is passing a particular gaming table, an RFID tag (or other signaling device) may be detected, or a transmitted signal be detected, by a wireless access point (or some other detection device) and an alert may be sent to the user inviting the user to play at that table and possibly to make a special bet at that table (e.g., a one-time-only, 100× pass line bet at a craps table). According to another related aspect, sensing or signaling devices (e.g., RFID tags) can also be used to trigger different actions depending upon where a player is located in the casino. For example, a player might be walking past a restaurant entrance. An alert may be sent to the player's gaming device indicating a promotional offer such as a 2-for-1 dinner special.

It should be understood that alerts can correspond to any of the activities, services, or ancillary or miscellaneous information described herein that can be accessed by, or distributed to users. Thus, alerts can relate to, for example, gaming activities, concierge services, news and investment information, merchandise and service transactions, administrative functions, financial transactions, credit status, etc.

Step 1116 may be performed according to any of the various communications techniques described herein or according to any generally known communication techniques. Preferably, once an alert has been generated and configured, it is forwarded to those users that the system determines should receive the alert. The alert may be forwarded, for example, over the same communication network that enables users to use gaming devices to access the various gaming activities and services of the system. However, the alert may be forwarded to users in other ways, such as on a separate communications network, or to a display or other communication device that is different from the gaming device being used by the user. For example, if an alert is going to out to a large number of users and the alert is one that is likely to be of marginal interest, the alert (although generated and/or configured in response to user activities, for instance), might be forwarded to a common display unit viewable from multiple locations in a casino gaming area.

Step 1118 is preferably accomplished by the user viewing the alert on the gaming communication device. The alert may be presented or displayed to the user in a format determined, at least in part, by any of the parameters described or contemplated herein. For example, if the user is located outdoors, the display may be automatically brightened in order to allow the user to more easily view the alert. The alert may be presented in any one or a combination of textual, visual, oral, or other information exchange formats. Alerts presented to users on the screen of a gaming communication device, for example, may be configured in any desirable manner Preferably, the information is displayed in a way as to most effectively utilize the screen real estate to convey the alert message. Thus, different alerts of differing types, or having differing priorities, can be displayed differently on the gaming device. For example, a more important alert can be displayed as a popup while secondary alerts scroll at the bottom of the screen. The player can register for alerts and determine his own particular alert configuration preferences.

According to an aspect of certain embodiments, directional information may be might be provided to one or more users. The directional information may be associated with an alert. The directional information may be based on any of the parameters described herein (e.g., profiles, alerts, locations, changes in play or other activities, etc). Directions may be given to activities, locations, seats, tables, recreational spots, restaurants, change cages, information booths, casinos, hotels, sports venues, theaters, etc. For example directions may be given to a particular table or gaming area, a casino other than the one where the user is presently located or where another user is located, a restaurant that is specified in a user profile, a sports book area of a casino, a hotel room, etc.

The directions can be presented orally, textually, and/or graphically (e.g., as map with zoom capabilities). An example of how directions would be provided involves a user profile indicating that the user likes to play high-limit blackjack on Saturday nights, but that the user does not have a particular casino preference. If the user enters any casino for which the system is operable, the system provides the user with an alert inviting the player to the high-limit blackjack tables and directional information in the form of a visual route. Another example involves a user leaving a sports book in a casino and the user has indicated that he wants to play craps. The device gives walking directions to the craps tables. Another example involves a user that has a preferred list of dinner restaurants. At a predetermined time (e.g., 8:00 pm), the system presents the user with the list, lets the user make a selection and a reservation. The system then provides the user with verbal directions from the user's current location to the selected restaurant. The system may also be configured to provide ancillary information based, at least in part, on the alert, the profile, or the directional information being provided. For example, the system may notify a user that the user will need a cab, or will need to take the tram, or will need a jacket and tie, or will need an umbrella, etc. depending on where the user is going and the route he is taking.

According to another aspect of certain embodiments, the system enables a user to view a certain activity or area remotely. For example, cameras (or other viewing devices) may be disposed throughout a casino property (or other relevant area). At kiosks, or on the wireless gaming devices, users can "peek" into one or more selected areas to see the activity in the selected area(s). For example, from the pool, a user can tell if the craps tables have changed limits or are filling up with people. From the craps table, a user can see if the restaurant or bar is becoming crowded.

According to aspects of certain embodiments, the operation of the alerts module and the alerts methods are integrated with various techniques for managing user profile information. User profiles are described in greater detail below in connection with FIGS. 9-10. An example of this aspect is that the system may be configured to recognize that a user has certain preferred dealers or stickmen when playing certain casino games. When those dealers or stickmen are on duty, and if the user is located in a certain area, or within a certain distance, an alert may be sent inviting the user to participate in the gaming activity at the particular table where the dealer or stickman is on duty.

Thus, when user profile information indicates that a one or more predetermined criteria are met, the system may send an alert to the corresponding user or to another user. For example, the system may "learn" that a player is a fan of certain sports teams. The system monitors information about upcoming events that involve those teams and, at a predetermined time, checks to see if the user has placed a bet on the event(s). If not, the system invites the user to visit a sports book to make a bet. As another example, the system knows a user prefers $10 minimum tables and alerts the user to the opening of a seat at such a table. As another example, the alerts can be triggered by information which is not directly related to or associated with the particular user (e.g., non-user specific information). For instance an alert might be triggered by a certain time or the occurrence of a certain event (e.g., the odds given on a certain sports event changing by a certain predetermined amount).

According to certain embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

At least certain embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino, may include as part of a profile certain rules governing the distribution of promotions or offers to the user. User profile information can include any codes, account numbers, credit information, concierge or other service information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may undertaken based on any suitable trigger, such as the occurrence of an event, the occurrence of a user activity, or the passage of a certain predetermined time period. Any or all of the profile information may be updated.

Certain user profile aspects are depicted in FIGS. 9 and 10, for example. As shown in FIG. 9, and as discussed above, system 912 preferably includes at least one database 922. The database(s) 922 may be any suitable database capable of receiving, storing, and/or distributing electronic data. One or more user profiles 924 are maintained within database 922. Each user profile 924 preferably consists of one or more data files. It should be, however, that the user profiles may be maintained in any form that allows establishment, maintenance, and or updating of the profiles via the transfer of electronic information. It should also be understood that the user profile information may be centralized or distributed and certain portions of user profile information may be maintained at different elements within or without system 910. A graphic user interface ("GUI") 926 may also be provided to enable or assist in the management of information within user profiles 924.

According to at least one embodiment, at least one user profile includes various information corresponding to at least one user of system 910. Such information may include, for example, user-specific information and non-user specific information. User-specific information may include any information that is determined in whole or in part by some characteristic of the user. For example, user-specific information may include information relating to user preferences, activities, habits, location, identity, etc. Non-user specific information may include any information that is not necessarily dictated by user characteristics. Non-user specific information may, however, be associated with one or more users. For example, non-user specific information may include gaming configurations, promotional information, activity schedules, etc.

Preference information may include any information which is at least partially determinative of a user's preferences with respect to at least one aspect of the gaming services. As such, preference information may be at least partially determinative of gaming presentation, gaming configuration, screen or display configuration, available activities, betting limits, service availability, service preferences, notifications, communication preferences, personnel and staff preferences, etc. Activity information may include any information reflecting a user's activities, whether they be gaming or service activities. As such activity information may include such things as indications of activity types during a particular time period, services and or games accessed by the user, applications for credit, funds transfers, service activities (e.g., dining, room service, laundry, car rental, etc.), bets made, win and loss information, cashing out activities, communication with staff, etc. Habit information may include any information reflecting an indication of a habit or trend of activity of a user. Such information may include, for example, increases or decreases in gaming times, bet amounts, frequency of activities, transfer of funds, times in which activities are undertaken, associations between two or more activities, etc. Location information may include any information related to a user's location within a predetermined space. The space may be a jurisdiction, state, region, country, city, casino property, casino gaming area, race track, sports venue, store, hotel, recreation area, restaurant, theater, or any other relevant space. The location information may include associated information such as date, time of day, or other information associated with the location of the user. The location information may include information to reflect location over a certain time period or multiple time periods. The location information may indicate a series of locations, a route, a preferred destination, etc. Identify information may include any information indicative of the identity of the user. Such information may include, for example, name, address, phone number, codes, social security numbers, passwords, user names, login identifications, and biometric information (e.g., retain scan, fingerprint, and voice print information).

Non-user specific information is intended to encompass any information that does not necessarily correspond to a particular user. Such information can include gaming configurations, schedules, available gaming activities or services, displays, menus, announcement content, promotional content, information about other users or non-users (e.g., staff), and the like.

FIG. 10 illustrates an example method 1010 for establishing, maintaining, modifying, and acting on, a user profile. According to a first step 1012, a user profile is initially established. The establishment of the user profile may comprise the creation of one or more data files to include one or more pieces of profile information. The profile information may include, for example, user-specific information such as name, credit information, and identity information. The user information may be any type of information considered or discussed herein. At step 1014, an event occurs, which impacts at least one piece of information within the user profile. At step 1016, the user profile is updated as a result of the event. In certain cases, the user profile is updated to reflect and/or record the occurrence of the event. In other instances, the occurrence of the event merely causes a piece of information to be updated. At step 1018, the user profile is queried to determine the existence of one or more parameters. A parameter may be any suitable piece of information. For example, the query may determine whether any portion of the user profile information matches a piece of information specified by the query. At step 1020, if the response to the query is affirmative, then a response action is initiated. Otherwise, the method returns to step 1014 to accept additional updates of the user profile.

Figure 2:
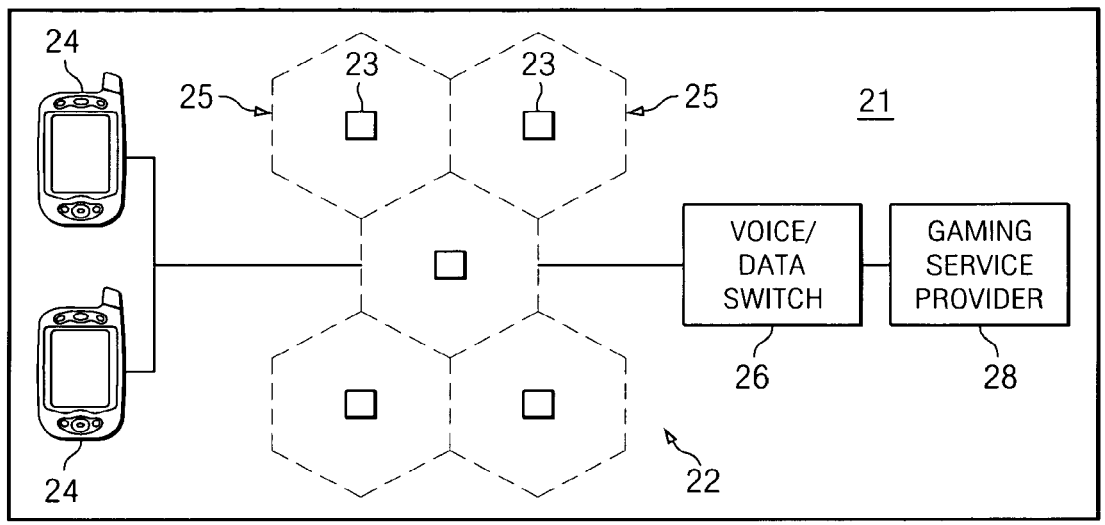
FIG. 2 illustrates a gaming system with a wireless network according to an embodiment of the present invention.

Other aspects of the various embodiments of the wireless gaming system are shown in FIGS. 2-8. According to one embodiment, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which is preferably connected to the wireless portion of the network via a dedicated, secure landline. The communications network also includes a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the gaming system is enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via Private T-1 lines to a switch. A gaming service provider leases a private T-1 or T-3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. Although in certain embodiments some data and/or voice traffic may be communicated at least partially over the Internet, it is preferred that the communication path does not include the Internet.

Alternatively, in some embodiments, certain non-gaming information may be transported over a path which includes the Internet, while other information relating to the gaming activities of the system is transported on a path that does not include the Internet.

Figure 3:
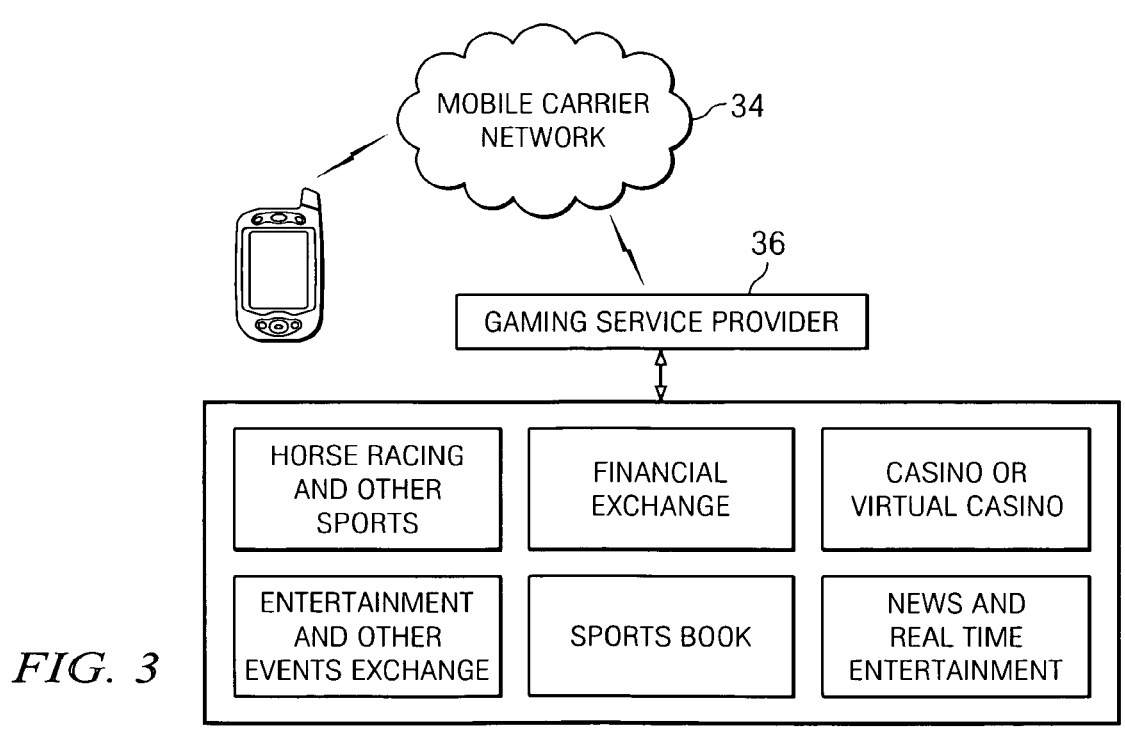
FIG. 3 is a block diagram of a gaming system illustrating various gaming activities in accordance with an embodiment of the present invention.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential gaming or related activities.

Figure 4:
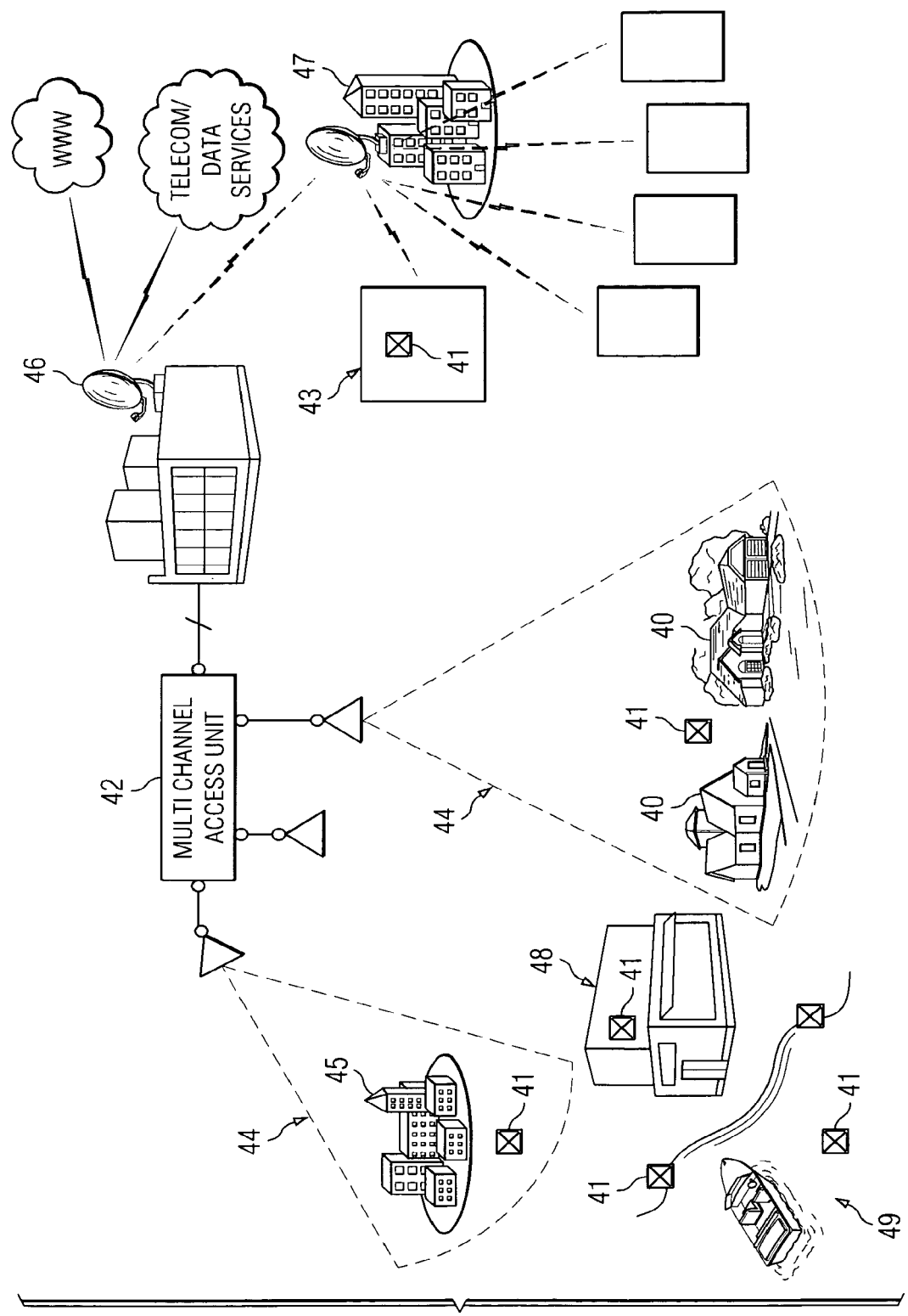
FIG. 4 illustrates a gaming system showing coverage areas in accordance with an embodiment of the present invention.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because certain embodiments of the technology cover smaller areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified within the scope of the present invention.

In one embodiment, the system architecture for the gaming system includes:

(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices are preferably WiFi- or WiMax-enabled PDAs or mini-laptops, and do not have to be managed by a third-party partner.

Preferably, the gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may include such technologies as multi-lateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In one embodiment, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
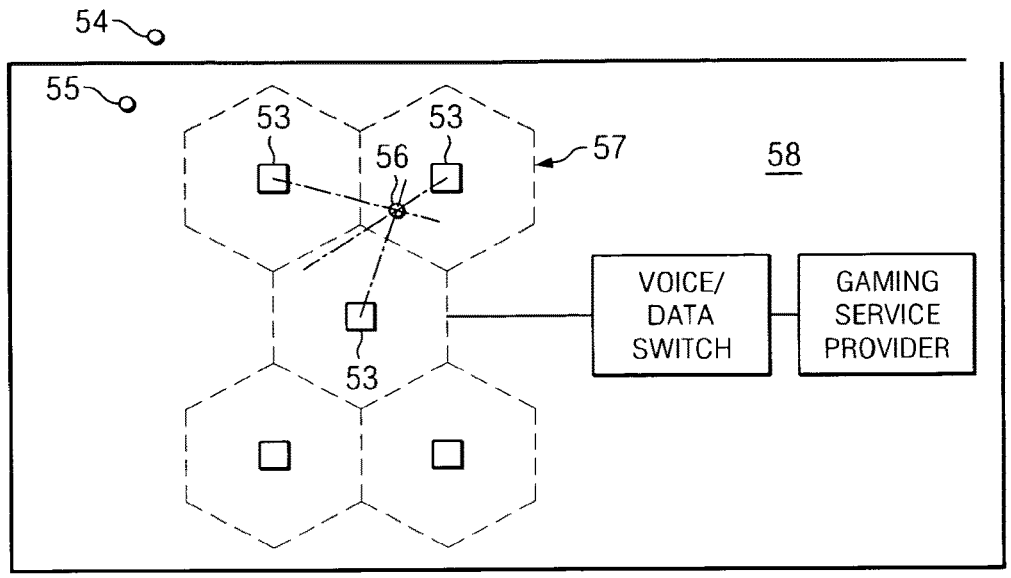
FIG. 5 illustrates a gaming system with a wireless network showing triangulation location determination in accordance with an embodiment of the present invention.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In another embodiment, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

In connection with FIG. 6, an example embodiment of a method according to the present invention can be described as follows. As discussed, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

Figure 6:
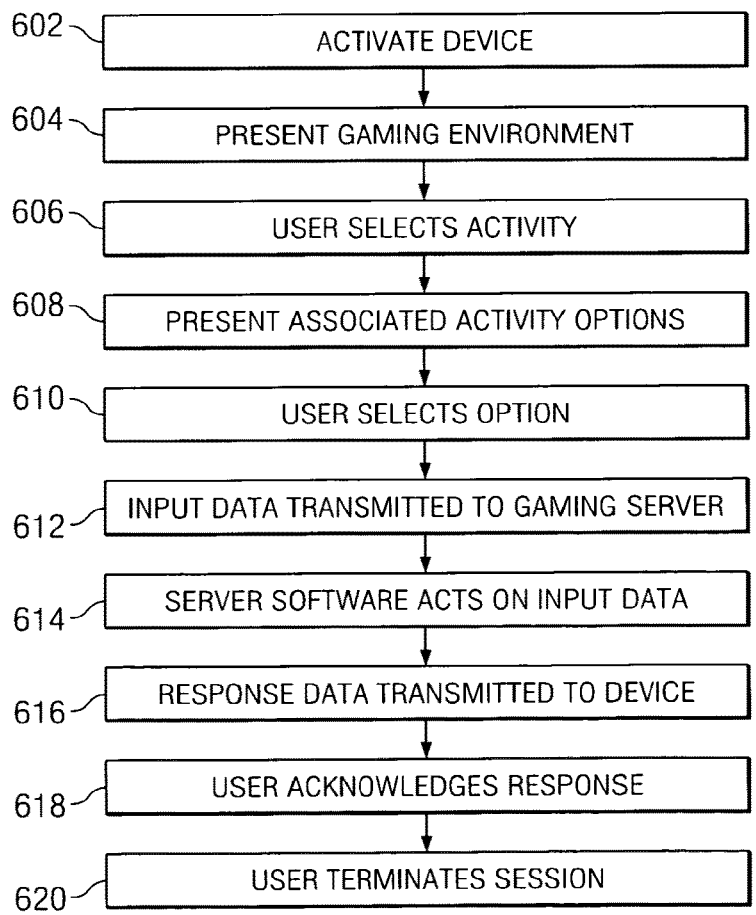
FIG. 6 is a flow chart depicting steps in a gaming method according to an embodiment of the present invention.

In the example method shown in FIG. 6, in a first step 602, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 604, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 606, the user selects an activity, such as a particular casino table game. In step 608, the user is presented with one or more options related to the selected activity. In step 610, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 612, the software resident on the gaming communication device accepts the option input by the user and transmits the input data to the software resident at the gaming server. In step 614, the gaming server software acts on the input data.

Actions at this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 616. In step 618, the user acknowledges the response. For example, in the case of gambling, the user might acknowledge that he won a hand of blackjack because the dealer busted and that his payout was $100 based on a $50 bet at even odds. In step 620, the user logs out.

In the situation where the user is gambling, after the series of steps described in connection with FIG. 6, (or a subset or modified series of steps), the user physically enters a casino and goes to a casino cashier for payout and/or settlement (which can include, for example, extensions of credit or advance deposits). In one embodiment, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

The duration of activation of the gaming communication device, the duration of a particular session, and/or the duration of a particular activity may be controlled according to any number of different parameters. For example, the duration may be based on a predetermined amount of time or period of time. Activation of the gaming communication device may terminate upon the expiration of a predetermined time period. As another example, an activity may only be permitted until the occurrence of a particular time of day. According to an alternative, an administrator, or another party to a transaction within any of the various activities, may determine the time period or amount of time. According to yet another alternative, the duration may end upon the occurrence of an event such as the user entering or leaving a particular location. The duration of activation may be dynamically determined based on a period of non-use. In other words, after a predetermined time without being used, the device may "time out" and be deactivated. The period of time, or amount of time, may be cumulatively determined. For example, an activity may only be permitted for a period of five hours, collectively. Time counting toward the five hours might stop and start depending upon the location of the user. As another example, an activity might only be permitted so long as the user does not enter or leave a particular location for longer than a predetermined period of time.

Similarly, activation of the gaming communication device and/or the ability for a user to engage in a particular activity may only be permitted during a specified time of day, or for a particular period of time prior to an event, or for a particular period of time after notification to the user. Also, activation and/or access may be controlled based upon the location of the user. For example, if a user is in a particular casino in which a particular show will take place that evening, the user might be notified that tickets to the show are available for a specified period of time prior to the show. The user might only be permitted to engage in the activity of purchasing tickets for the show if the user is in the casino and during the specified period of time prior to the show. For example, the user might only be able to purchase tickets while in the casino and up to five minutes before the start time of the show. Similarly, the activation of the device may be restricted based on the location of the user and a corresponding period of time. For example, if a user is in a location where a show is occurring, or is going to occur, the device may be deactivated (either automatically, or by a party other than the user) during a period beginning five minutes prior to the show and ending five minutes after the end of the show.

According to another alternative, the duration or enablement of one activity might be determined by the participation of the user in another activity. For example, a user might be allowed to make dinner reservations at a popular restaurant if the user has been gambling enough at a given casino. In this way, bonuses or comps may be determined or managed based on the activity of the user via the gaming communication device.

Figure 7:
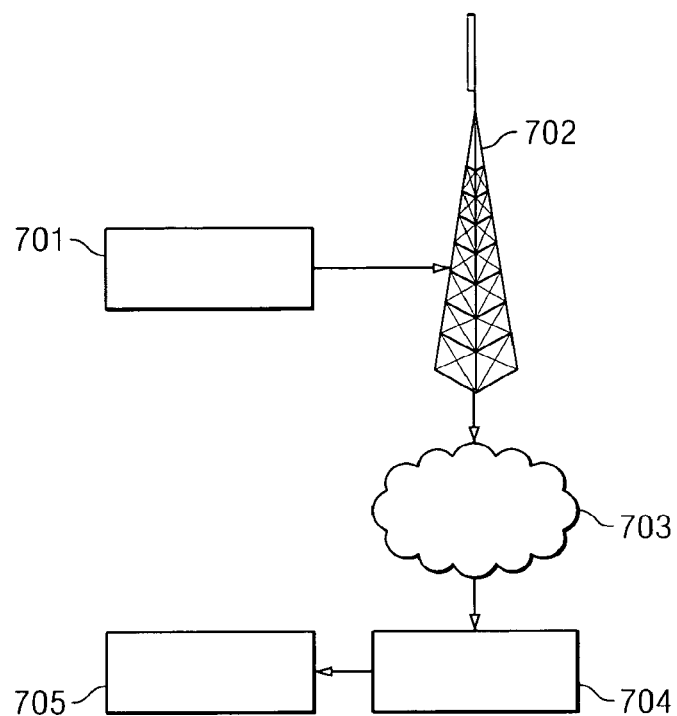
FIG. 7 depicts a gaming system showing a communication path in accordance with an embodiment of the present invention.

Preferably, data is transmitted back and forth during the gaming activities between the gaming communication device and a server controlled by the gaming service provider. An example of the path of communication is shown in FIG. 7. Gaming data, such as a wager placed by the user, is transmitted from gaming communication device 701 to a base station 702 (or a transmitter in the case of a private wireless network such as a WiFi or WiMax network). Base station 702 routes the data through network 703 to a hub or gateway 704, which in turn routes the data to a gaming server 705 operated by a gaming service provider. Preferably, the communication from gaming communication device 701 to the network 703 comprises wireless communication. This may be any type of known wireless communication or any type of wireless communication available in the future. Examples of acceptable wireless communication protocols include CDMA, GSM, and GPRS.

Preferably, the communication from the network 703 to the gateway 704 and to the server 705 is conducted over secure land lines. FIG. 7 is an example communication network only and the present invention should be understood to cover other networks in which data may be transmitted from gaming communication device 701 to server 705. Preferably, data in response to data being transmitted from gaming communication device 701 to server 705 is transmitted back to gaming communication device 701 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino.

With respect to payment and/or receipt of winnings and losses, one possible approach is as follows. Upon check-in at a casino hotel, a hotel representative may query a guest as to whether the guest wants access to a gaming communication device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the gaming activities. For example, a user might remotely (via the gaming communication device) place an order at a restaurant. Then, the user might make advance payment for the meal at an ATM-type machine which is operable to receive instructions corresponding to the financial transaction requirements of the gaming activity of ordering food.

A unique aspect of the present invention includes establishing an electronic record of the gaming transactions undertaken by a user. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 8:
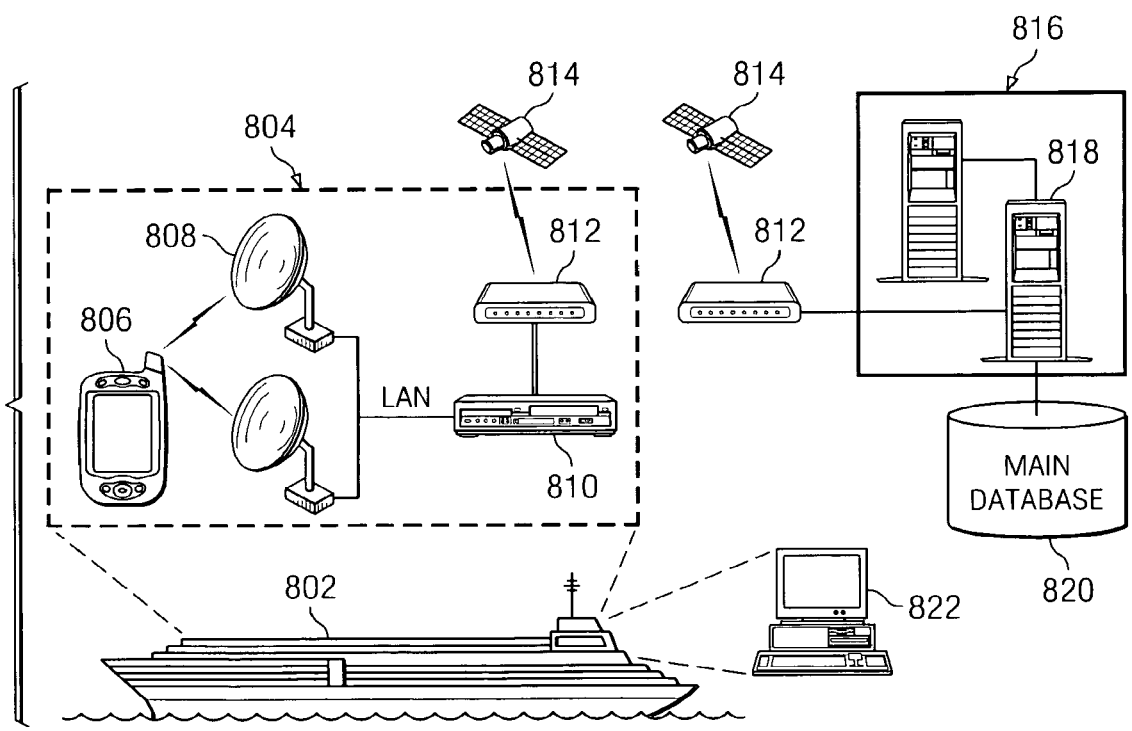
FIG. 8 illustrates a ship-based gaming system in accordance with an embodiment of the present invention.

In another embodiment of the invention, as shown in FIG. 8, a ship-based gaming system is provided. The system preferably comprises passenger vessel 802, such as a cruise liner for example. The system includes one or more gaming communication devices 806 connected to a communication network. The network shown in FIG. 8 comprises a mobile network with base stations 808 connected via a LAN to a base station controller (BSC) 810. BSC 810 is connected via a T1 interface to a first Very Small Aperture Terminal (VSAT) modem 812, which is in communication with a first satellite 814. First satellite 814 is operable to transmit and receive signals from second satellite 814, which is in communication with second VSAT modem 812. Second VSAT modem 812 is in communication with a gaming server 818 located at gaming service provider 816. Gaming server is coupled to gaming database 820. Again, the network configuration depicted in FIG. 8 is for example purposes only, and other configurations are within the scope of the present invention. An on-board back office 822 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the gaming system. In one example scenario the user is in a fixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a gaming transaction at a first location and ends the transaction at a second location different from the first location. In another example scenario, the user is mobile during a single gaming transaction. In another example scenario, the user is mobile within a first approved area then (during the gaming transaction) the user moves outside the first approved area, through an unapproved area, to a remote second approved area.

In an alternative embodiment, the gaming system may be configured to operate as a "curb-to-curb" gaming system. In such a system, a communication path may be established between the device and a particular server, based upon whether the user is in a location corresponding to that particular server. For example, the user might enter a first casino, or an authorized area associated with the first casino, and thereby activate the establishment of a communication path between the device and a server located at and/or controlled by the first casino. While the user is on the premises of the first casino, the user might be able to participate in activities, such as playing blackjack, at the first casino. Then, if the user leaves the first casino, the gaming system might be configured to terminate the first communication path (i.e., between the device and the first casino's server), or otherwise deactivate the device and/or terminate the user's ability to use the device to participate in activities associated with the first casino. When the user enters a second casino, or an authorized area associated with the second casino, a second communication path (e.g., between the device and a second server located at or controlled by the second casino) may be established. Thus, the user would now be able to play blackjack (or engage in other activities) at the second casino, rather than the first casino.

As another example, a particular casino is often related to other casinos within a jurisdiction or specified area. Under such a scenario, if a user entered any of the related casinos, then the appropriate communication path or paths could be established between the gaming communication device and one or more of the casinos in the group of related casinos, thereby enabling the user to play casino games (or engage in other activities) at the one or more casinos in the group of related casinos. Depending on regulatory requirements, the preferred configuration might be to establish a communication path with a server at a particular casino within the group at which the user wants to play. Then, a different communication path could be established at a subsequent casino if the user wants to play at another casino. Under certain circumstances, and again depending on regulatory requirements, some information associated with user activity might be maintained at a centralized server accessible by more than one casino within the group.

In another example embodiment, the gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility. Further, the invention is not limited to gaming, but can include other applications, such as trading financial instruments, and wagering on other types of events, such as elections, award events, or any other activity.

Another example embodiment involves the application of one or more of the methods and systems described herein to the activity of conducting financial transactions. Thus, the gaming communication device may be configured to enable a user to conduct such financial transactions, which may include, without limitation, any transaction involving a financial institution, such as banking, trading securities, or managing 401K or other investment fund assets. Preferably, a communication path would be established between the user and any of the servers or other computers necessary to conduct the financial transaction. As with certain other embodiments the ability to engage in this activity may be controlled by one or more parameters including location and/or identity verification and time or duration limits.

Conducting financial transactions may be one of the activities presented to the user of the gaming communication device. Any of the possible financial transactions might be presented as sub-activities. As an example, a user might want to trade securities listed on a particular exchange. Regulations might require the trader to be located within a certain jurisdiction to execute trades on the exchange. The exchange might have its own rules and could require that the trader be located on the premises. With the location verification techniques described elsewhere herein, the particular financial transaction activity might only be enabled if the user is located in a particular geographic area, for example.

As a related feature, the system may be configured to provide a credit verification feature, according to which a user's creditworthiness may be checked by a party to a transaction, or by which the user might apply for credit. For example, if a user wants to purchase $10,000 worth of a particular stock, then a communication path might be established between the user and a server located at and/or controlled by an exchange upon which the stock is being traded. An additional communication path might be established between the exchange server and a server of an account manager that manages the user's account. These communication paths would enable the basic transaction—that of the user purchasing the stock. Yet another communication path, however, might be established between a seller's server, the exchange server, and/or the account manager server and a server located at and/or controlled by a credit agency. This path would enable an interested party to the transaction to check and/or approve the user's credit to prior enabling the transaction.

According to one aspect of certain embodiments, a user of the gaming communication device can connect from the device to a financial service provider's server to provide a "Push to Trade" feature. In order to enable this feature, the device is configured to be capable of facilitating a "Push to Talk" protocol, whereby the device behaves like a walkie-talkie. Thus, the device may include any suitable program or application that enables the Push to Talk feature. As used herein, the phrase "Push to Talk" includes any protocol that allows for a direct connection feature for an end user. Included are all such protocols (e.g. Instant Talk, Fastchat, etc.) within the broad rubric of "Push to Talk" including those that provide wide-area, instantaneous contact.

The Push to Talk protocol allows a given device to instantly connect to any number of other devices, such as any other telephone (mobile or landline-based), personal computer, laptop, etc. The connection for the end user does not have to be spawned by any conventional dialing or by triggering some form of automatic dialing. A simple button can be depressed to provide the requisite connection. In the context of timing, Nextel (who developed the original Push to Talk technology) suggests that their Push to Talk protocol should connect within 2 seconds.

A related technology is Push to Talk Over Cellular (PoC). PoC service is a form of interactive voice messaging that combines walkie-talkie and cellular phone connectivity, allowing users to quickly connect with another person or an entire group of friends and contacts at the push of a button on a PoC-enabled handset.

The Push to Talk protocol allows users to use the walkie-talkie paradigm over an IP or a cellular network, which diminishes the boundary limitations of a conventional two-way radio. The Push to Talk service is based on a disruptive technology. Latency is an issue during some traditional mobile telephone conversations. One appeal of the Push to Talk platform, as compared to executing a traditional telephone call, is being able to talk to an individual or to a group of individuals instantly, without waiting for someone to answer due to latency issues. Another benefit of the Push to Talk feature is a shorter than normal phone call, which cuts down on dialing costs for corresponding end users. Nextel estimates that the average Push to Talk call lasts forty seconds. Push to Talk technology is compatible with virtually any network communications; for example, the Push to Talk protocol may readily be used in conjunction with cellular telephone networks, including GSM and CDMA. The network equipment used for the Push to Talk feature is currently being offered by companies such as Ericsson Motorola, Siemens, Sony Ericsson, and Nextel.

Because Push to Talk effectively turns the handheld device into a walkie-talkie, it not only successfully enables end users to send voice messages, it also enables immediate data texts (commonly referred to as "direct messaging"). Push to Talk messaging represents a significant improvement over short messaging systems in bypassing the slow and clumsy process of entering text via a phone keypad. This makes text messaging quicker and more effective.

According to the "Push to Trade" feature, once the end user initiates the call, the financial service provider is instantly connected to the end user. In one embodiment, the financial service provider has one or more electronic trade desks that are dedicated to this feature for their clients. Thus, all "Push to Trade" requests may be received at this location.

In other embodiments, any suitable entity, broker, standard trading desk, or electronic device may receive such Push to Trade communications.

Once the connection has been established, the financial service provider may then simply conduct the trade as prescribed by the end user. For example, upon connection, the end user may be presented with the financial or market environment in which he seeks to participate. The trade desk representative or device can query the end user to execute an electronic or a broker-assisted trade. In addition, the financial environment may be presented in various stages. For instance, in a first stage, the financial environment may comprise a financial summary of all markets where the user is presented with certain financial options including, for example, specific market summaries, specific prices for selected assets (e.g. commodities, stocks, bonds, etc.), current positions, buying power, etc. In a subsequent stage, the user may be presented with optional instances of the type of activity selected from the market platform.

From this platform, the end user can select an activity, such as a particular type of trade. Thus, the user is presented with one or more options related to the selected activity. For instance, at this point, the user might place a buy or a sell order on a financial exchange. The software, which may be resident on the device, on the server, or on a combination of both, accepts the option input by the user and transmits the input data to the financial service provider. Subsequently, the financial service provider acts on the input data. The Push to Talk technology readily accommodates a voice log of the transaction for audit or confirmation purposes. Hence, a digital voice storage may be provided, whereby the transaction (e.g., inclusive of bid and ask prices) is recorded. In addition, the automatic voice log can then relay this information back to the end user (e.g., via his e-mail or via a conventional postal mail service). This could occur as a matter of course such that the end user is routinely provided with a suitable confirmation receipt for all of his trading activity.

Actions at this point may include, without limitation, determining an outcome and/or amount for the trade, accessing another server and/or software application, retrieving additional information, preparing a suitable response to the user, etc. The action of determining an outcome and/or amount might take place, for example, if the user is using the device to place trades in conjunction with his account and a given exchange. Hence, this could include a formal tallying of the executed trade, inclusive of the charged commission, the amount debited from the account to cover the trade, etc. The action of accessing another server and/or software application might occur, for example, in the event the user is engaging in a services activity such as accessing news services. The action of retrieving information might occur when the financial software is prompted to access another server for the purpose of retrieving a certain type of information requested by the user. The financial service provider can then prepare a response to the user's input data. Once this activity has concluded, the user can acknowledge the response and then log out and terminate his session.

It should be noted that the "Push to Trade" feature can be used in other applications of the gaming technology described herein. For example, in an application where the user of the gaming communication device is playing blackjack from an authorized area outside the casino gaming area, the Push to Trade feature would enable the user to participate audibly in the blackjack game actually taking place within the casino gaming area. The Push to Talk technology would allow the user to immediately and virtually "sit down" at an actual blackjack table without the delay caused by the conventional setup and tear down process of certain traditional telecommunication protocols. Also, once the user is participating in the game, the user can communicate orally with the dealer, or other users that are physically at the table, without the latency issues of certain mobile telecommunication systems.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. Identity verification can also be accomplished by monitoring a keystroke characteristic (e.g., rhythm, patterns, or cadence) of the user, or any other method in which a parameter uniquely associated with the user can be observed. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo-fencing) to conform the gaming activities to legal parameters.

Consumers may benefit from an increased choice of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business, on the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to an embodiment of the invention, the gaming system provides for the dissemination of real-time odds to users accessing the system.

In another embodiment, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. An apparatus to facilitate communication over a network between interface devices of mobile electronic devices, comprising:
at least one processor; and
at least one memory having instructions stored thereon which, when executed by the at least one processor, direct the at least one processor to:
determine a first location of a first mobile electronic device of a first user, the first mobile electronic device being operable to make a plurality of interactive applications available to the first user for use via the first mobile electronic device, each of the plurality of interactive applications being configured to receive input from the user via one or more user input devices of the first mobile electronic device;
determine whether to enable operability of the plurality of interactive applications to the first user for use via the first mobile electronic device based on whether the first mobile electronic device is located in an area within the first location;
determine whether to disable operability of the plurality of interactive applications to the first user for use via the first mobile electronic device based on whether the first mobile electronic device is located in an area outside the first location;
determine that the first user is using one of the plurality of interactive applications at the first location, in which the first user provides at least one input to a gaming application as one of the plurality of interactive applications via the one or more user input devices of the first mobile electronic device;
determine a change in location of a second mobile electronic device of a second user;
responsive at least to (a) determining a change in location of the second mobile electronic device and (b) determining that the first user is using one of the plurality of interactive applications via the mobile electronic device at the first location, cause a communication comprising an alert with information about the first location of the first mobile electronic device to be output at the second mobile electronic device; and
store a first user profile associated with the first user and a second user profile associated with the second user, and wherein content and display of the alert is at least partially dependent upon information in the first user profile and the second user profile, wherein the alert provides directional information based at least partially on the location of the first user.

2. The apparatus of claim 1, wherein the communication comprises an invitation to participate in a gaming activity, and in which the first mobile electronic device comprises a first mobile gaming device operable to make a plurality of gaming activities available to the first user for play via the first mobile gaming device, and in which the second mobile electronic device comprises a second mobile gaming device operable to make a plurality of gaming activities available to the second user for play via the second mobile gaming device.

3. The apparatus of claim 1, wherein the communication information comprises an invitation to place a bet, in which the act of determining that the first user is using one of the plurality of interactive applications at the first location comprises determining that the first user is engaged in a gaming activity at the first location, in which the one of the plurality of interactive applications prompts the user for input via an interface of the first mobile electronic device.

4. The apparatus of claim 1, in which the instructions, when executed, further direct the at least one processor to:
determine that the first location is near to a location where a service is provided; and
responsive to determining that the first location of the first user is near to the location where a service is provided, transmit to the first mobile electronic device a promotional announcement comprising an advertisement for the service.

5. The apparatus of claim 1,
wherein the instructions, when executed by the at least one processor, further direct the at least one processor to transmit a second communication to the second user, the second communication comprises at least one of: (1) scheduling information regarding an upcoming event; (2) information determined based on a financial status of the first user; (3) information about betting limits at a gaming table; and (4) information regarding odds associated with a gambling opportunity, and
wherein the communication comprises at least one of an audible signal, a verbal message, a textual message, and a graphical display on a display screen of the second mobile electronic device.

6. The apparatus of claim 1, in which the instructions, when executed by the at least one processor, further direct the at least one processor to receive from the first user one or more parameters for triggering transmission of the communication to a mobile electronic device.

7. The apparatus of claim 1, in which the instructions, when executed, further direct the at least one processor to transmit information to the second mobile electronic device based on a placement of a bet by the first user.

8. The apparatus of claim 1, in which the instructions, when executed, further direct the at least one processor to transmit information to the second mobile electronic device based on a selection of an activity by the first user on the first mobile electronic device.

9. The apparatus of claim 1, in which the instructions, when executed, further direct the at least one processor to transmit information to the second mobile electronic device based on a size of a bet in a game.

10. The apparatus of claim 1, in which the instructions, when executed, further direct the at least one processor to transmit information to the second mobile electronic device based on an arrival of the first user at a specific location.

11. The apparatus of claim 1, in which the instructions, when executed, further direct the at least one processor to transmit information to the second mobile electronic device based on a departure of the first user from a specific location.

12. The apparatus of claim 1, wherein the communication comprises directional information comprising directions from a location of the second user to a location associated with the first user, in which the first user is using the application at a time when the communication is output at the second mobile electronic device.

13. The apparatus of claim 1, in which the communication comprises directions from a current location of the second user determined by the at least one processor to at least one of: (1) an event; (2) a current location of the first user determined by the at least one processor; and (3) a location of a gaming table in a casino.

14. The apparatus of claim 1, in which the act of determining the change in location of a second mobile electronic device comprises at least one of:
(1) determining that the second user has left a second location that is different from the first location;
(2) determining that the second user has entered the first location; and
(3) determining that the second user has entered a second location that is different from the first location.

15. The apparatus of claim 1, in which the communication comprises information about a specific gaming table of a casino, and in which the first location of the first mobile electronic device comprises a location at the specific gaming table.

16. The apparatus of claim 1, in which the second mobile electronic device comprises a display screen, and in which the instructions, when executed by the at least one processor, further direct the at least one processor to cause the display screen to display information about a location of the first user.

17. A method to facilitate communication over a network between interface devices of mobile electronic devices, the method comprising:
determining, by at least one processor, a first location of a first mobile electronic device of a first user, the first mobile electronic device being operable to make a plurality of interactive applications available to the first user for use via the first mobile electronic device;
determining, by the at least one processor, that the first user is using one of the plurality of interactive applications at the first location, in which the one of the plurality of interactive applications prompts the first user to enter a plurality of inputs at an interface screen of the first mobile electronic device;
determining, by the at least one processor, whether to enable operability of the plurality of interactive applications to the first user for use via the first mobile electronic device based on whether the first mobile electronic device is located in an area within the first location;
determining, by the at least one processor, whether to disable operability of the plurality of interactive applications to the first user for use via the first mobile electronic device based on whether the first mobile electronic device is located in an area outside the first location;
determining, by the at least one processor, a change in location of a second mobile electronic device of a second user;
responsive at least to (a) determining a change in location of the second mobile electronic device and (b) determining that the first user is providing input to a gaming application as one of the plurality of interactive applications via the mobile electronic device at the first location, causing, by the at least one processor, a communication comprising an alert with information about the first location of the first mobile electronic device to be output at the second mobile electronic device, wherein information about the location of the first user is not caused to be output at the second mobile electronic device until it is determined that the location of the second mobile electronic device has changed; and
storing, by the at least one processor, a first user profile associated with the first user and a second user profile associated with the second user, and wherein content and display the alert is at least partially dependent upon information in the first user profile and the second user profile, wherein the alert provides directional information based at least partially on the location of the first user.

18. A non-transitory machine-readable medium having instructions stored thereon that are configured to facilitate communication over a network between interface devices of mobile electronic devices and to cause at least one processor to:
determine a first location of a first mobile electronic device of a first user, the first mobile electronic device being operable to make a plurality of interactive applications available to the first user for use via the first mobile electronic device;

determine whether to enable operability of the plurality of interactive applications to the first user for use via the first mobile electronic device based on whether the first mobile electronic device is located in an area within the first location;

determine whether to disable operability of the plurality of interactive applications to the first user for use via the first mobile electronic device based on whether the first mobile electronic device is located in an area outside the first location;

determine that the first user is using one of the plurality of interactive applications at the first location, in which the first user using the one of the plurality of interactive applications comprises the first user inputting a plurality of inputs into the first mobile electronic device;

determine a change in location of a second mobile electronic device of a second user; and responsive at least to (a) determining a change in location of the second mobile electronic device and (b) determining that the first user is providing input to a gaming application as one of the plurality of interactive applications via the mobile electronic device at the first location, cause a communication comprising an alert with information about the first location of the first mobile electronic device to be output at the second mobile electronic device; and store a first user profile associated with the first user and a second user profile associated with the second user, and wherein content and display of the alert is at least partially dependent upon information in the first user profile and the second user profile, wherein the alert provides directional information based at least partially on the location of the first user.

19. The non-transitory machine-readable medium of claim 18, wherein the communication comprises an invitation to participate in a gaming activity, and in which the first mobile electronic device comprises a first mobile gaming device operable to make a plurality of gaming activities available to the first user for play via the first mobile gaming device, and in which the second mobile electronic device comprises a second mobile gaming device operable to make a plurality of gaming activities available to the second user for play via the second mobile gaming device.

20. The non-transitory machine-readable medium of claim 19, wherein the communication information comprises an invitation to place a bet, in which the act of determining that the first user is using one of the plurality of interactive applications at the first location comprises determining that the first user is engaged in a gaming activity at the first location.

* * * * *